Figure 3:
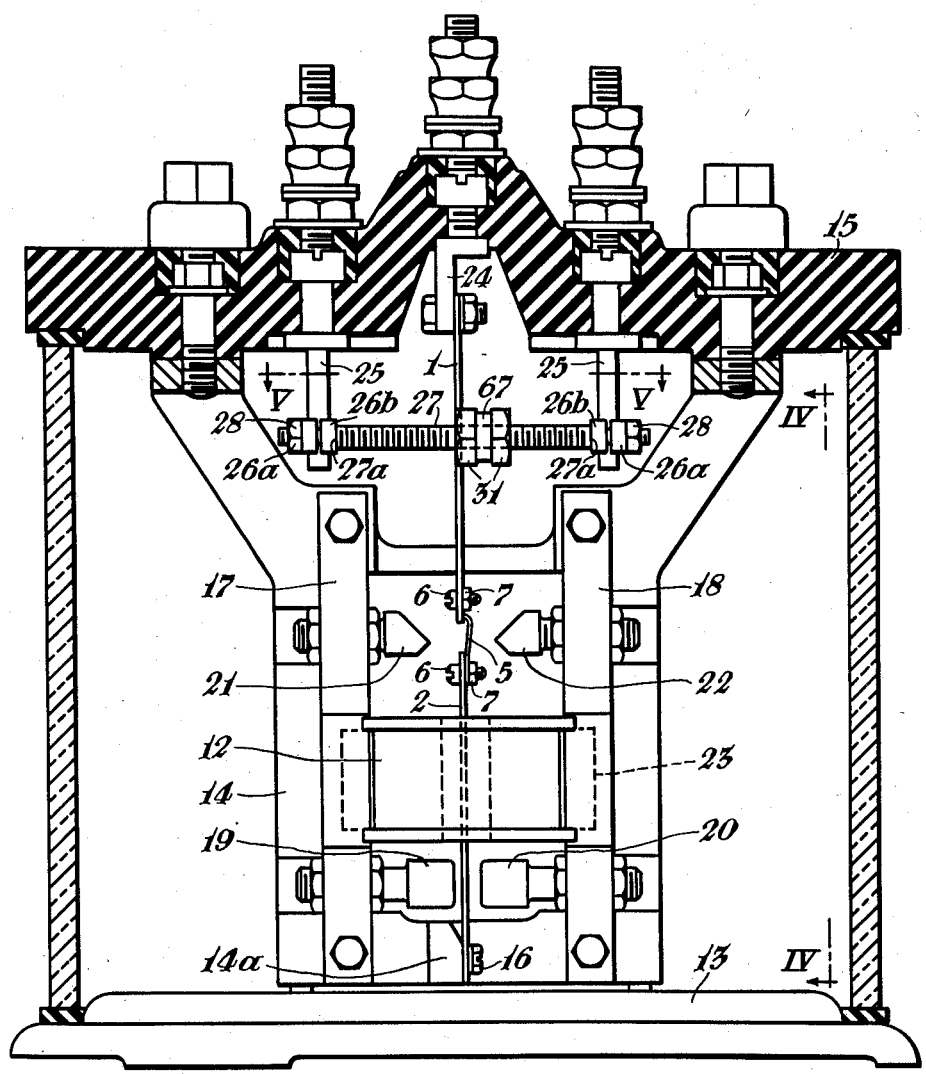

Dec. 16, 1952 C. B. SHIELDS ET AL 2,622,168
FREQUENCY RESPONSIVE RELAY
Filed Sept. 8, 1949 5 Sheets-Sheet 1
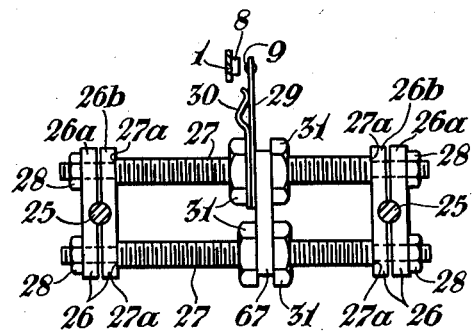
Fig. 5.
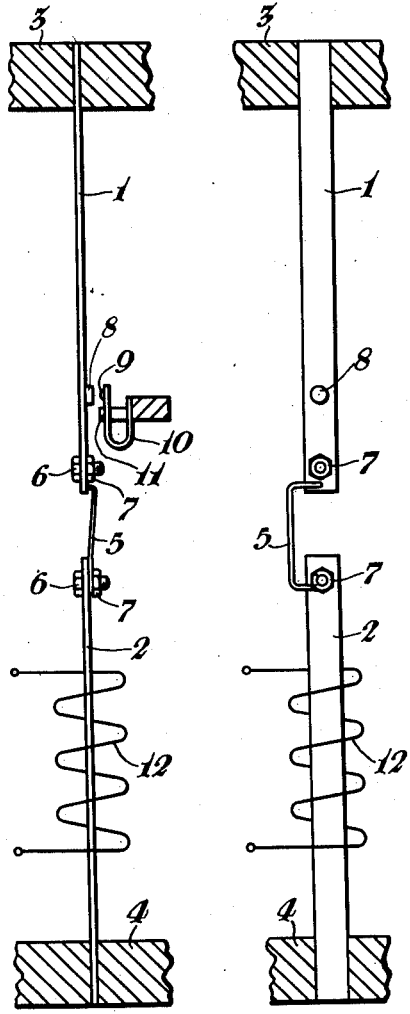
Fig. 1. Fig. 2.
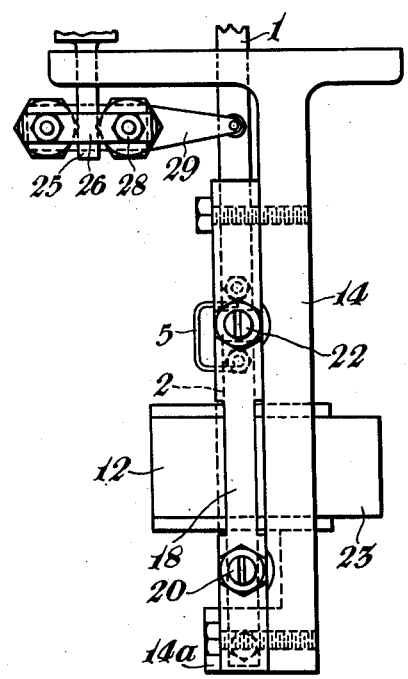
Fig. 4.
INVENTORS.
Charles B. Shields and
Walter P. Quintin Jr.
BY
THEIR ATTORNEY INVENTORS.
Charles B. Shields and
Walter P. Quintin Jr.
BY
THEIR ATTORNEY INVENTORS.
Charles B. Shields and
Walter P. Quintin Jr.
BY
THEIR ATTORNEY

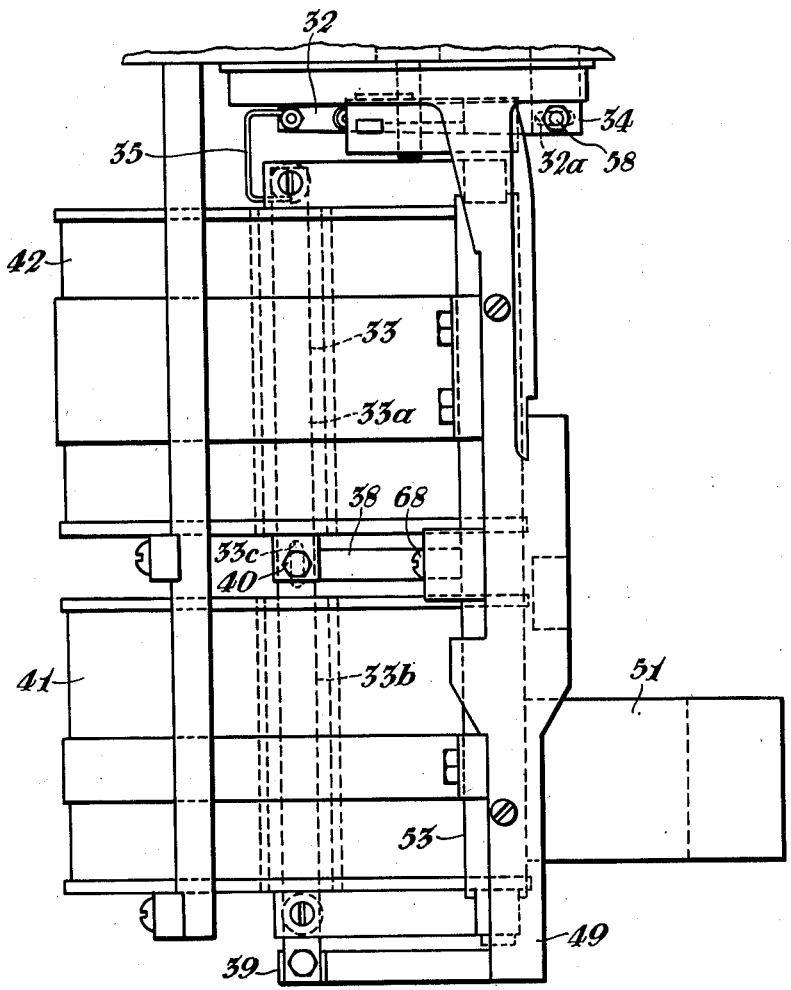

Patented Dec. 16, 1952

2,622,168

UNITED STATES PATENT OFFICE 2,622,168

FREQUENCY RESPONSIVE RELAY

Charles B. Shields, Penn Township, Allegheny County, and Walter P. Quintin, Jr., Wilkinsburg, Pa., assignors to Westinghouse Air Brake Company, a corporation of Pennsylvania Application September 8, 1949, Serial No. 114,536

3 Claims. (Cl. 200—91)

1

Our invention relates to frequency responsive relays, and particularly to relays which respond to alternating electric current having a frequency within a predetermined band or range.

Commercially available sources of alternating current of the direct current inverter type do not provide alternating current of absolutely fixed frequency. The frequency tends to drift and may also vary, as for example, with the voltage of the source of direct current or with the ambient temperature. Consequently, it has been unsatisfactory to utilize such sources in frequency selective systems, that is, in systems in which a relay is picked up in response to current of one frequency but not responsive to current of a different frequency. In testing such systems, it was found that mechanically resonant relays sometimes fail to pick up because of a slight variation in the frequency of the source to which the relays were tuned.

It is an object of our invention to provide an improved relay which responds to alternating current within a predetermined range or band of frequency.

Another object is to provide such a relay of the mechanically resonant vibrating reed type.

A further object is to provide such a relay having sharp cut-off characteristics at the edges of the band of frequency to which it responds.

Another object is to provide, in such a relay, means for adjusting the frequency to which the relay responds.

A further object of our invention is to provide such a relay having a low power consumption.

We carry out the foregoing and other objects of our invention by providing a relay including two mechanically tuned reeds, both mechanically resonant at the lower cut-off frequency of the band pass range over which the relay is to respond. We connect the free ends of these reeds by a spring chosen so that the spring and one reed together form a mechanical system having a natural frequency equal to the upper cut-off frequency of the selected range. We place one of the reeds in a magnetic circuit comprising two pairs of confronting pole pieces connected to backstraps which are constantly supplied with flux from a permanent magnet. The one reed is supported at its fixed end in such a position that it is equidistant from the pole pieces of both pairs and is surrounded by an energizing winding to which the energizing current is supplied. The other reed carries near its free end a contact which cooperates with a spring supported fixed contact.

2

We have found that such a structure will intermittently close the contacts whenever the winding is energized by alternating current having a frequency between the limits determined respectively by the natural frequency of one reed and the natural frequency of the mechanical system consisting of one reed plus the connecting spring.

The apparatus of our invention is an improvement over that which is disclosed in the copending application, Serial No. 210,358, filed February 10, 1951, by Andrew Hufnagel, for Code Following Relay with Frequency Decoding Contacts.

Figure 7:
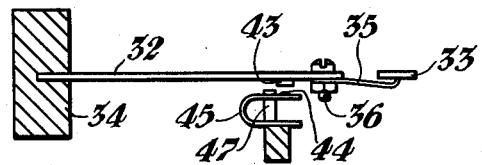
Figure 10:
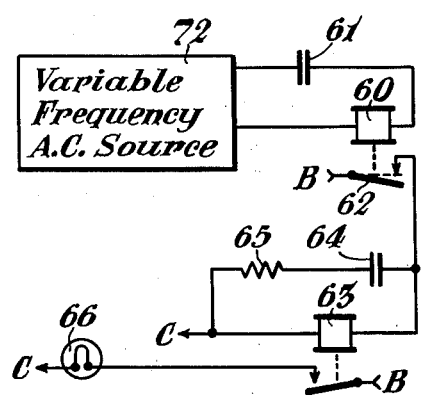
Figure 6:
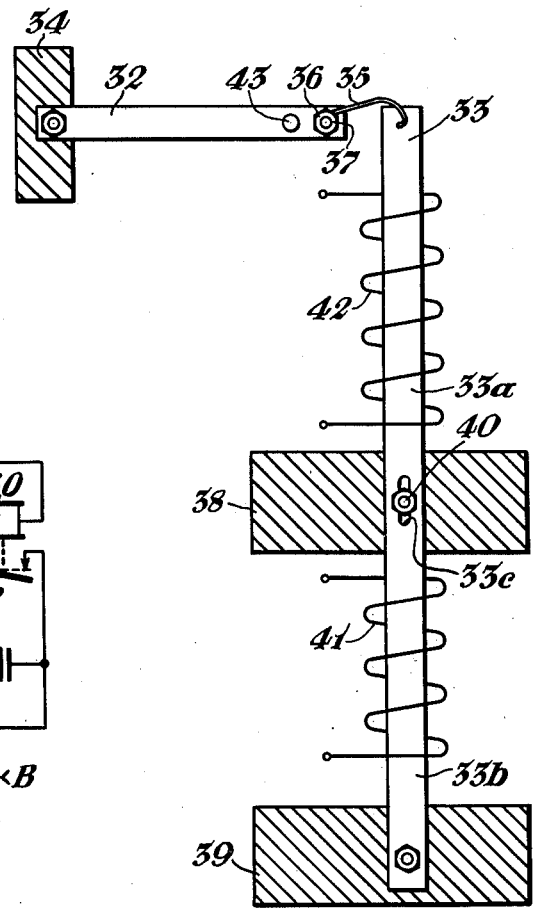
Figure 9:
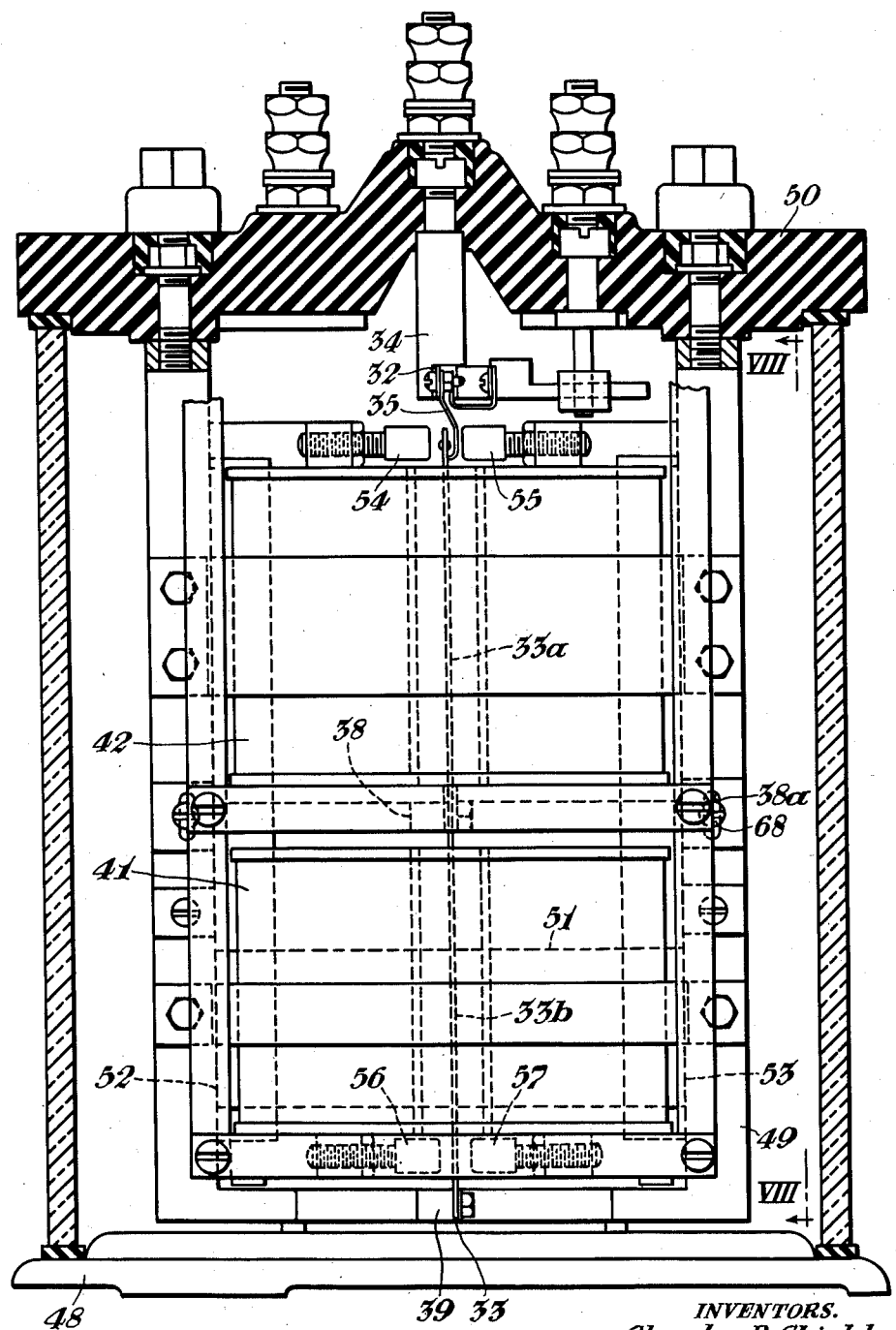

In the accompanying drawings, Fig. 1 is a somewhat diagrammatic elevational view of the essential elements of a relay embodying our invention. Fig. 2 is a right-hand side view of the structure of Fig. 1. Fig. 3 is an elevational view of a complete relay embodying our invention and similar to that shown diagrammatically in Figs. 1 and 2. Fig. 4 is a right-hand elevational view of the relay shown in Fig. 3. Fig. 5 is a fragmentary view taken along the line V—V of Fig. 3, looking in the direction of the arrows. Fig. 6 is a somewhat diagrammatic elevational view illustrating the elements of a different form of relay embodying our invention. Fig. 7 is a top plan view of the structure shown in Fig. 6. Fig. 8 is an elevational view of a complete relay corresponding generally to the structure shown diagrammatically in Figs. 6 and 7. Fig. 9 is a left-hand elevational view of the relay of Fig. 8. Fig. 10 is a somewhat diagrammatic view illustrating an electric circuit suitable for use with the resonant relay disclosed herein.

Figs. 1 and 2

These figures illustrate the fundamental elements of a frequency band responsive resonant relay built in accordance with our invention. In these figures there are shown two vibrating reeds 1 and 2 having their remote ends respectively fixed in suitable supports 3 and 4. The reeds 1 and 2 are designed to be mechanically resonant at the lower cut-off frequency to which the relay is responsive. The free ends of the reeds 1 and 2 are connected by a light wire spring 5, one end of which is rigidly fastened by means of a bolt 6 and a nut 7 on the free end of the reed 2, and the other end of which is held in engagement with the end of the reed 1 by a small amount of tension in the wire spring.

The reed 1 carries a contact 8 which cooperates with a stationary contact 9 carried on the end of a spring finger 10. The finger 10 is self biased toward the movable contact 8, but its motion in that direction is limited by a fixed stop 11.

An electric winding 12 encircles the reed 2 and when supplied with current energizes the magnetic circuit (shown in Figs. 3 and 4) to apply to the reed 2 a vibrating force having a frequency corresponding to that of the alternating current supplied to the winding 12.

*Figs. 3, 4 and 5*

These figures illustrates a complete relay including those essential elements shown and described in connection with Figs. 1 and 2. Those elements in Figs. 3 to 5 which correspond exactly to their counterparts in Figs. 1 and 2 have been given the same reference numerals, and will be further described only insofar as it is necessary to explain their relationship to the other structural elements.

The relay shown in these figures includes a base plate 13, a frame 14 mounted by suitable means on the base plate and supporting a top plate 15, of insulating material. The frame 14 is of nonmagnetic material. It is provided with a lug 14a, to which the lower end of the reed 2 is attached by means of a screw 16. A pair of vertical backstraps 17 and 18, of magnetic material, is attached to the frame 14. A pair of lower pole pieces 19 and 20 is adjustably mounted on the backstraps 17 and 18, respectively, and extend toward the reed 2. A pair of upper pole pieces 21 and 22 is similarly adjustably mounted on the backstraps 17 and 18 and extend toward the reed 2 near its upper extremity.

One or more permanent magnets 23 connect the two backstraps 17 and 18, and thereby provide magnetic flux which threads through two parallel paths, one through the lower pole pieces 19 and 20, and one through the upper pole pieces 21 and 22. The reed 2 is positioned substantially midway between both sets of pole pieces, and is hence not attracted to either pole piece by the permanent magnet flux.

The winding 12 encircles the reed 2 and is supported by the lower cross member of the frame 14.

The reed 1 is supported by a bracket 24 carried by the top plate 15.

The top plate 15 also carries a pair of downwardly projecting rods 25 carrying crossbars 26. Each of the crossbars 26 comprises two pieces 26a and 26b. A pair of elongated bolts 27 extends through both of the cross bars 26. The bolts 27 are provided with shoulders 27a near their opposite ends, against which shoulders the innermost parts 26b of the crossbars 26 rest. The two parts of the crossbars are provided with opposed semicylindrical recesses near their center for engagement with opposite sides of the rods 25. Nuts 28 on the ends of the bolts 27 hold the crossbars 26 clamped tightly together and against the shoulders 27a. By loosening the nuts 28, the entire assembly including the bolts 27 can be adjusted vertically on the rods 25.

Near their center portions, the bolts 27 carry a yoke 67. A spring finger 29 and a stop 30 are fastened to the yoke 67 by means of nuts 31 which are threaded on the bolts 27. The spring finger 29 carries the stationary contact 9 which engages the contact 8 on reed 1. The finger 29 is self biased into engagement with the stop 30, which limits the movement of contact 9 toward the normal position of the contact 8.

*Operation of Figs. 1 to 5*

When no current is flowing in the winding 12, then the flux established by the permanent magnet 23 traverses a magnetic circuit which may be traced from the left or north pole of magnet 23, as viewed in Fig. 3, to the backstrap 17, poles 21 and 22 in parallel with poles 19 and 20, and thence through backstrap 18 to the right-hand pole of magnet 23. The reed 2 has its lower end positioned midway between the poles 19 and 20 and its upper end midway between poles 21 and 22, so that its upper end is not attracted to either of the latter poles by the permanent magnet flux.

Let it be assumed that an alternating current is supplied to the winding 12. During one half cycle, the winding 12 induces a magnetic flux in the reed 2 which flows upwardly through that reed. During the alternate half cycle, the winding 12 induces a flux in the reed 2 which flows downwardly through that reed. During each half cycle, the reed 2 tends to assume a position, which reduces to a minimum the reluctance of the magnetic circuit for the flux induced by the winding 12. This condition is met when the reed 2 assumes a position such that the magnetomotive force on winding 12 aids that of the permanent magnet 23. Therefore, during the half cycle when the winding 12 induces an upward flux in the reed 2, that reed is attracted toward the right in Fig. 3 toward the pole 22. The flux induced by winding 12 then flows through a magnetic circuit which may be traced from the upper end of reed 2 through pole 22, backstrap 18, permanent magnet 23, backstrap 17, pole 19, and thence to the lower end of the reed 2. It should be noted that in this circuit the magnetomotive force of the winding 12 and of the magnet 23 are aiding each other. During the half cycle when the magnetomotive force of the winding 12 acts downwardly, the flux induced by it flows from the lower end of the reed 2 through pole 20, backstrap 18, magnet 23, backstrap 17, pole 21 to the upper end of reed 2. Reed 2 is thereby attracted to the left, toward the pole 21.

It may therefore be seen that an alternating current supplied to the winding 12 produces an alternating magnetomotive force which reacts with the magnetomotive force of the magnet 23 to produce a physical vibrating force on the reed 2, tending to vibrate the reed at a frequency corresponding to the frequency of the alternating current supplied to winding 12.

If the winding 12 is supplied with alternating current having a frequency somewhat lower than the resonant frequency of reeds 1 and 2, and the frequency of the current is gradually increased, the amplitude of vibration of reed 2 increases, reaching a maximum when the current frequency is equal to the natural frequency of that reed. The vibration amplitude of reed 1 remains negligible until the frequency of the current is substantially equal to the natural frequency of the reed, at which time the reed 1 starts vibrating with a considerable amplitude. The structure illustrated produces a very sharp cut-off in the vibration of the reed 1 at current frequencies below the natural frequency of the reed.

As the current frequency is increased above the natural frequency of the reed which marks the lower limit of the relay response, toward the natural frequency of the mechanical system comprising either one of the reeds and the spring 5, which marks the upper limit of the relay response, the amplitude of vibration of reed 2 decreases slowly. The amplitude of vibration of reed 1 decreases slightly until the current frequency reaches a value approximately midway between the upper and lower limits of relay response, at which time the vibration amplitude of reed 1 increases again until the upper limit of frequency response is reached, at which time the reed 1 is vibrated with substantially its maximum amplitude.

If the current frequency is increased above the upper limit of frequency response of the relay, the reed 1 suddenly stops vibrating, and the reed 2 continues to vibrate with decreasing amplitude as the frequency gets farther away from its natural frequency. The cut-off action of the upper reed formed at the upper limit of relay response is just as sharp as at the lower limit.

The response of the vibrating reed to frequency variation is independent of the direction in which the frequency is changing. If the current frequency is changed from a value higher than the frequency response range of the relay, gradually decreasing until it reaches a value within the frequency response range, then the operation of the vibrating elements at any particular frequency is the same as during the increasing frequency operation described above.

The effect of the position of contacts 8 and 9 with respect to the free end of the reed 1 should be mentioned. Obviously, the amplitude and speed of vibration of the reed 1 is greatest at its free end and gradually decreases toward its fixed end. If the contacts 8 and 9 are mounted near the free end, the speed with which the contacts close will be a maximum, and may be great enough to cause contact rebound. For a given amplitude of vibration of reed 1 the contacts 8 and 9 may be adjusted for the maximum opening when they are located at the free end of the reed. If the contacts are mounted near the fixed end, the lower speed of closing will prevent contact rebound, but the contact opening must be made very low in order that the contacts close at all. Accordingly, the contacts are preferably so placed relative to the ends of the reed that the contact opening may be made as large as possible, but the contact rebound will be minimized.

The natural frequency of the reeds 1 and 2 of Figs. 1 to 5 may be varied by changing the mass of the reed. This may continually be done by adding small threaded flanges to the bolts 6 at the tips of the reeds.

It may be necessary to secure proper operation at some frequency to increase the frictional load on the operation of the reeds. This may conveniently be done by wrapping the reeds in a rubber tape or other suitable material having a high internal friction.

Figs. 6 and 7

These figures illustrate, somewhat diagrammatically, the essential elements of a modified form of relay embodying our invention. These elements include a reed 32, shown extending horizontally, and a reed 33, shown extending vertically. The reed 32 has one end fixed in a support 34 and at its free end carries a spring 35 by means of a bolt 36 and a nut 37. The opposite end of the wire spring 35 bears against the free end of reed 33.

Reed 33 is supported on base supports 38 and 39. Support 38 divides the reed 33 into a vibratory section 33a and a rigid section 33b. Reed 33 is fastened to support 38 by means of a bolt 40 which extends through a slot 33c in the reed 33. A coil 41 encircles the rigid section 33b of the reed 33 and is connected in series with a coil 42 which encircles the vibratory section 33a of reed 33.

The reed 32 carries near its end a contact 43, which cooperates with a stationary contact 44 carried by a spring finger 45. Finger 45 is self biased to cause contact 44 to engage contact 43. The movement of contact 44 toward contact 43 is limited by a fixed stop 47.

It may be seen that the structure shown in Figs. 6 and 7 is generally similar to that of Figs. 1 to 5. The structure of the magnetically driven reed 33 and its windings 41 and 42 is quite different from that of the magnetically driven reed 2 and its winding 12 in Figs. 1 to 5. The structure shown in Fig. 6 is utilized to provide an increased space for windings on the magnetically driven reed, without requiring an elongation of that reed which would vary its natural frequency.

It should also be noted that the reeds 32 and 33 do not vibrate in the same plane, but rather vibrate in planes perpendicular to each other. No particular relationship between the planes of vibration of the two reeds is necessary to practice our invention.

As pointed out above, the spring 35 is not fastened to the reed 33, but only bears against it. It is not necessary in the practice of our invention that the spring connecting the two reeds be fastened to both reeds. It is only necessary that the spring be so arranged that it can transmit mechanical force between the two reeds.

Figs. 8 and 9

There is shown in these figures a drawing of a complete relay built in accordance with our invention applying the essential features illustrated in Figs. 6 and 7. Those elements which correspond completely with their counterparts in Figs. 6 and 7 have been given the same reference numerals in Figs. 8 and 9, and will not be further described.

The relay includes a base plate 48, a frame of nonmagnetic material 49, mounted on the base plate, and a top plate 50 carried by the frame 49. The top plate 50 carries the support 34 for the reed 32. The support 39 for the lower end of reed 33 is an extension of the frame 49. The support 38 for the central portion of reed 33 is a bracket adjustably mounted on the frame 49 by means of machine screws 68 extending through slots 38a in the bracket.

The relay of Figs. 8 and 9 is provided with a magnetic circuit similar to that of the magnetic circuit of the relay shown in Figs. 3 to 5, and including a permanent magnet 51, backstraps 52 and 53, upper pole pieces 54 and 55, and lower pole pieces 56 and 57.

Reed 32 is attached to its support 34 by means of a bolt 58 which passes through a slot 32a in the reed 32. By means of this slot, the active length of the reed 32, and hence its natural frequency of vibration, may be adjusted to correspond to the desired lower limit of the frequency band. This frequency of vibration may also be changed by means of adjustable weights in accordance with well-known procedure. Similarly the frequency of the vibrating section 33a of the reed 33 may be tuned to the exact lower limit of the frequency band by adjusting the vertical position of the support 38 by means of the two machine screws 68 and the two slotted holes 38a in conjunction with the bolt 40 and the slotted hole 33c. Thus the two reeds 32 and 33 may readily be adjusted to have the same natural frequency as required by the minimum frequency to which the relay is required to respond.

As in the case of the relay shown in Figs. 3 to 5, the reed 32 and the vibratory section of reed 33 are mechanically tuned to a natural frequency which is the lower cut-off frequency of the frequency response range of the relay. The spring 35 and one of the reeds 32 or the vibratory section of reed 33 together form a mechanical system having a natural frequency which is the upper cut-off frequency of the frequency response band of the relay.

The operation of the relay shown in Figs. 8 and 9 is analogous to the operation of the relay shown in Figs. 3 to 5, and it is believed that a further description of the operation is unnecessary.

*Fig. 10*

There is shown in this figure an electrical wiring diagram showing a circuit suitable for use with either of the relays previously described. This frequency band responsive relay is illustrated in Fig. 10 at 60. Its winding is connected in series with a condenser 61 to a variable frequency alternating current source generally indicated at 72. Condenser 61 is chosen so as to balance its reactance against that of the winding 60 and the reflected mechanical reactance at mid-frequency within the range to which the relay 60 responds.

Relay 60 is shown as having a vibrating contact 62, which corresponds to the contact 43—44 of Figs. 6 to 9 and contacts 8 and 9 of Figs. 1 to 5. Contact 62 is connected in an obvious energizing circuit for a relay 63. A condenser 64 and a resistor 65 are connected in series in a shunt branch extending across the terminals of the winding of relay 63. When the vibratory contact 62 is closed, it completes an obvious energizing circuit extending from a battery terminal B through winding 63 to battery terminal C. At such times, the circuit through condenser 64 is completed to charge that condenser. When the contact 62 opens, the charge on condenser 64 discharges through the winding 63 and thereby maintains winding 63 energized. When the contact 62 is vibrating at a frequency determined by the characteristics of condenser 64 and resistor 65, the relay winding 63 is maintained steadily energized. That relay is provided with a front contact which controls an obvious energizing circuit for a signal lamp 66, whose energization indicates that the relay 60 is being supplied with current within the band of frequencies to which it is sensitive.

Although we have herein shown and described only a few forms of frequency responsive relays embodying our invention, it is understood that various changes and modifications may be made therein within the scope of the appended claims without departing from the spirit and scope of our invention.

Having thus described our invention, what we claim is:

1. A resonant relay responsive to alternating electrical currents of every frequency within a predetermined range, comprising two spaced reeds each tuned to be mechanically resonant at the lower cut-off frequency of said range, a resilient member operatively connecting said reeds and forming with one reed a mechanical system resonant at the upper cut-off frequency of said range, an electric winding associated with one of said reeds and effective to apply to said one reed a vibratory force having a frequency corresponding to that of the electric current with which said winding is supplied, a contact carried by the other reed, and a stationary contact adjacent said reed-carried contact so as to be engaged intermittently thereby when said current has any frequency within said range.

2. A resonant relay responsive to alternating electrical currents of every frequency within a predetermined range, comprising two spaced reeds each tuned to be mechanically resonant at the lower cut-off frequency of said range, a flexible member connecting said reeds and forming with one reed a mechanical system resonant at the upper cut-off frequency of said range, an electric winding associated with one of said reeds and effective to apply to said one reed a vibratory force having a frequency corresponding to that of the electric current with which said winding is supplied, a contact carried by the other reed, a stationary contact adjacent said reed-carried contact to be engaged intermittently thereby when said current has any frequency within said range, and a spring supporting said stationary contact and having a spring rate negligibly small as compared to the spring rate of said other reed.

3. A resonant relay responsive to alternating electrical currents of every frequency within a predetermined band or range of frequencies, comprising two reeds spaced end to end and each tuned to be mechanically resonant at the lower cut-off frequency of said range, the adjacent ends of said reeds being free and the opposite ends of said reeds being fixed, a spring member one end of which is rigidly attached to one of said reeds adjacent the free end of said one reed and the other end of said spring member held by only the resiliency of said spring member in engagement with the other reed adjacent the free end of said other reed, an electric winding surrounding said one reed and effective to apply to said one reed a vibratory force having a frequency corresponding to that of electric current which is supplied to said winding, a contact carried by said other reed, and a second contact adjacent said reed-carried contact so as to be engaged intermittently by said reed-carried contact if and only if the current supplied to said winding has any frequency within a band or range of frequencies determined by the physical characteristics of said spring member and of said reeds.

CHARLES B. SHIELDS.
WALTER P. QUINTIN, Jr.

REFERENCES CITED

The following references are of record in the file of this patent:

UNITED STATES PATENTS

| Number | Name | Date |
|---|---|---|
| 1,666,681 | Burgess | Apr. 17, 1928 |
| 1,737,761 | Holte | Dec. 3, 1929 |
| 2,014,514 | Augustadt | Sept. 17, 1935 |
| 2,113,617 | Harrison | Apr. 12, 1938 |
| 2,163,195 | Edwards | June 20, 1939 |
| 2,231,404 | Blackman et al. | Feb. 11, 1941 |
| 2,327,395 | Blosser et al. | Aug. 24, 1943 |
| 2,356,229 | Dunlap et al. | Aug. 22, 1944 |